Patented Oct. 5, 1943

2,331,268

UNITED STATES PATENT OFFICE 2,331,268

PRESERVATION OF WOOD

Albert L. Flenner, Wilmington, Del., Frank H. Kaufert, St. Paul, Minn., and Paul L. Salzberg, Carrcroft, Del., assignors to E. I. du Pont de Nemours & Company, Wilmington, Del., a corporation of Delaware No Drawing. Application April 25, 1939, Serial No. 269,856

12 Claims. (Cl. 167—38.7)

This invention relates to the preservation of wood and similar cellulosic materials, especially to preventing fungal attack of freshly sawn lumber during the seasoning period, and is particularly directed to new and useful processes in which such materials are rendered immune to fungal attack by treatment with the mercury-containing product of the reaction of an organic mercury compound of the type RHgX with a compound selected from the class consisting of phenols and salts of phenol, especially with a substance selected from the class consisting of pentachlorophenol and its salts; and still more particularly to new and useful compositions of matter which comprise the simple mixture or the reaction mixture of an organic mercury compound of the type specified with a phenol and its salts.

Freshly sawn lumber during the seasoning period is subject to attack of various microorganisms which cause staining and discoloration, the most troublesome being the blue-staining fungi (Ceratostomella) which penetrate deeply and discolor the lumber and the blue molds (Penicillia) that grows principally on the surface and cause objectionable surface discoloration. The diverse habits of these two entirely different types of organisms make effective control difficult. Quite aside from any question of specific toxicity which would lead to more or less effective control of one or more of the two types of organisms, other factors mainly of a physical nature operate to reduce effectiveness of control. Thus, lack of retention of the toxin over the seasoning period may result in inadequate protection, especially when the seasoning period is prolonged due to adverse weather conditions. Evaporation of readily volatile compounds such as ethyl mercury chloride may cause the surface portions of the lumber to become so depleted of toxin that the blue molds develop substantially unchecked, while the toxin still remains in the sub-surface portions in sufficient concentration to afford protection against the deeply penetrating blue-staining fungi.

Other compounds commonly used in the industry as surface treatment for stain and mold control, such as the chlorinatel phenols, lack the high toxicity of the mercury compounds and suffer other disadvantages which lessen their usefulness. Thus, the high concentrations, that is, around about one per cent solutions, necessary to obtain effective control with chlorinated phenols are disadvantageous in that such concentrations are also toxic to human beings and are likely to cause dermatitis.

We have now discovered new and effective methods for controlling fungi attack on freshly sawn lumber during the seasoning period in which the freshly sawn lumber is rendered immune to attack by treating it with the mercury-containing product of the reaction of an organic mercury compound of the type RHgX with phenols and their salts and especially with substituted phenols of the type hereinafter to be more particularly described. Still more particularly we have found that effective control of both the blue-staining fungi and the blue molds can be obtained by treating the freshly sawn lumber with aqueous solutions of the mercury-containing product of the reaction with an aliphatic mercury compound such as an ethyl mercury compound of the type $C_2H_6HgX$ with pentachlorophenol and its salts.

In the treatment of freshly sawn lumber to render it immune to fungal attack during the seasoning period the green lumber is dipped in aqueous solutions of the preservative prior to being stacked for seasoning. The treatment is essentially a surface treatment, no effort being made to make the lumber permanently resistant to attack since special treatments are required to obtain deep impregnation of sap-filled lumber. The treatments which we have outlined above and will presently describe in greater detail are particularly suitable for such surface treatments in that they provide high toxicity to the organisms causing stain and mold so that relatively dilute aqueous solutions may be employed and at the same time provide the desired physical properties essential to the obtention of complete protection against blue molds throughout the seasoning period, even when greatly extended due to adverse weather conditions. In its broader aspects, however, our invention contemplates other types of preservative treatments and the use of other types of solvents. It also contemplates the use of our novel compositions in other and related fields, and particularly as disinfectants or preservatives for paints, lacquers, plastics, wood pulp or ground wood, seed treatments and the like.

The mercury-containing product of the reaction of an organic mercury compound of the type RHgX with a phenol or phenol salt is the essential active principle of the treatments of our invention. The product may be comprised in the crude reaction mixture of the two reagents above described or it may be formed in situ in the treating solution or in the treated lumber, or it may be isolated in the pure form and used as such. As far as we have been able to determine the product has the mercury phenolate structure RHgOPh. On treatment with aqueous potassium iodide they yield the corresponding organic mercury iodide, RHgI, and the potassium salt of the corresponding phenol. For example, ethyl mercury pentachlorophenate $C_2H_5HgOC_6Cl_5$ yields on treatment with aqueous potassium iodide, ethyl mercury iodide and potassium pentachlorophenolate. This means of identifying the organic mercury phenolates may be used to advantage since many of them, especially the organic mercury chlorophenolates containing large quantities of chlorine, do not readily respond to the usual methods of analyzing for mercury.

Of the various available organic mercury compounds of the type RHgX, such as butyl mercury hydroxide and its salts, ethyl mercury hydroxide and its salts, heptyl mercury hydroxide and its salts, hexyl mercury hydroxide and its salts, isopropyl mercury hydroxide and its salts, methyl mercury hydroxide and its salts, phenyl mercury hydroxide and its salts, etc., we prefer ethyl mercury chloride or the more soluble ethyl mercury phosphate. These mercury salts react readily in aqueous solutions with the various types of soluble phenolates, such as the sodium salts of phenol, tetrachlorophenol, trichlorophenol, pentachlorophenol, paranitrophenol, orthophenylphenol, and 2-chloro-ortho-phenylphenol, to yield the corresponding alkyl mercury phenolate. The organic mercury hydroxides react actively with the free phenols, even if solvents are not employed. In any case, whether an organic mercury salt or hydroxide, or the free phenol or its salt are employed, other solvents may be used as a reaction medium.

The compositions of our invention comprise simple mixtures of the two reagents, that is, of the organic mercury compound of the type RHgX and the phenol or soluble salt of the phenol, or the reaction mixture of the two reagents or suitably prepared mixtures containing the pure organic mercury phenolate, or the pure organic mercury phenolate by itself. When simple mixtures are dissolved in the treating bath, and in such cases the phenolic reagent is best used in the form of the soluble salt, reaction takes place causing the formation of the organic mercury phenolate, which, as the solution is evaporated from the treated lumber, is deposited on the surface and in the sub-surface portions of the treated lumber. Thus, the compositions of our invention, whether simple mixtures or reaction mixtures or prepared from the pure organic mercury phenolate, are all characterized in that the lumber treated with aqueous solutions prepared from such compositions is rendered immune from fungal attack by the presence of an organic mercury phenolate.

In addition to the active ingredients in such compositions, whether they be simple mixtures or reaction mixtures or the pure organic mercury phenolate, there may be included other ingredients. Thus, our compositions may include soluble or insoluble carriers, or diluents such as lime, kaolin, magnesium sulfate, sodium sulfate, talc, etc., alkaline ingredients such as soda ash, trisodium phosphate, borax, etc., designed to give the treating baths an alkaline reaction, and such other ingredients as are commonly employed or as it may be found desirable to include in such compositions including other toxic ingredients.

Among such additional ingredients are the organic derivatives of tetravalent lead which result from the reaction of mercuric salts and tetra organic lead. Wood preservative compositions such as disclosed in Engelmann and Tisdale Patent 1,874,260 dated August 30, 1932, may be mixed with or reacted with phenol salts in accordance with the teachings of this invention. Thus, the reaction product $(2RHgX+R_2PbX_2)$ of the Engelmann and Tisdale reaction

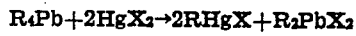
$$R_4Pb+2HgX_2 \rightarrow 2RHgX+R_2PbX_2$$

may be reacted with phenols or salts of phenol as suggested by the following reaction:

$$2RHgX+R_2PbX_2+4MeOPh \rightarrow$$
$$2RHgOPh+R_2Pb(OPh)_2+4MeX$$

The compositions of our invention comprise either the left-hand side or the right-hand side of this reaction, that is, either the simple mixture or the reaction mixture. The reaction mixture may also be obtained according to the following, which is a sum of the two preceding reactions:

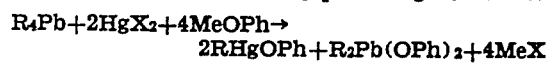
$$R_4Pb+2HgX_2+4MeOPh \rightarrow$$
$$2RHgOPh+R_2Pb(OPh)_2+4MeX$$

In this reaction mercuric oxide or any inorganic mercuric compounds capable of ionizing in acid media may be used.

Compositions derived in these manners also have the common characteristic that their aqueous solutions and the lumber treated therewith contain the organic mercury phenolate as an active fungi immunizing agent.

While the pure organic mercury phenolates are highly effective fungicides, we have not found it necessary or desirable to isolate the pure compound to obtain advantage of its fungicidal properties. Quite to the contrary, the simple mixtures or reaction mixtures described above have been found entirely suitable for the purposes of our invention.

In reactions of the type described the nature of the Me and X radicals is immaterial to the reaction or the effectiveness of the reaction product for the purposes described. Thus, X may be any anion such as the hydroxyl group or any acid anion such as chloride, acetate, phosphate, etc. Likewise, Me may be hydrogen or any suitable cation, and, depending upon the nature of X, will yield during the reaction a salt, or an acid, or a base, or water. As a practical matter no reason appears why the radical Me should be anything other than sodium, but we desire it to be understood that our invention is not so limited. The radical R may be any organic radical other than anions, i. e., any non-ionic organic radical. Being derivable from a compound of the type RHgX it is coextensive with the radical R in such compounds. Preferably, it is aliphatic and one of low molecular weight, e. g., less than 3 carbon atoms.

The radical Ph may be any monovalent aromatic hydrocarbon radical such as phenyl, diphenyl, naphthyl, tolyl, xylyl, vinylphenyl or other aryl and alkaryl groups and preferably having one or more of its hydrogen atoms replaced by acid groups such as nitro, halogen, thiocyanate, carbonyl, cyanide and like groups.

The amount of the active ingredients in our compositions as described above is not critical since more or less may be used as required to give the desired concentration in the treating bath. Those skilled in the art will be able after suitable tests to determine suitable concentrations, depending upon the particular conditions involved.

We have found is desirable, however, to maintain a certain balance between the amounts of the two active or reactive ingredients, that is, between the organic mercury compound of the type RHgX or its equivalent and the soluble salt of phenol. The latter is used, preferably, in an amount sufficient to react with all the mercury compound present and desirably is considerably in excess. More effective control of the two different types of organisms, that is, both the blue molds and the blue-staining fungi, is obtained when the treating solutions contain both the organic mercury phenolate and a soluble salt of pentachlorophenol. This may best be accomplished by using the sodium phenolate in the proper proportion to give both the organic mercury phenolate and sodium phenolate in the treating solution. Suitably such compositions, whether simple mixtures or reaction mixtures, may contain or may be prepared from about 1 to about 5 parts of sodium phenolate to each part of the organic mercury compound or its equivalent. For example, a composition containing one part of ethyl mercury phosphate and 4 parts of sodium pentachlorophenol is especially effective in controlling both blue-staining fungi and blue molds. Solutions prepared from this composition and containing as little as 0.012% ethyl mercury phosphate and 0.048% sodium pentachlorophenate give effective control.

Good results are also obtainable with ethyl mercury pentachlorophenolate alone. This compound may be prepared by reacting 10 parts of ethyl mercury phosphate and 11 parts of sodium pentachlorophenolate in 600 parts of water. The reaction is nearly quantitative and after washing the precipitate with water until neutral to litmus a 95% yield of ethyl mercury pentachlorophenolate is obtained. One part of this product dissolved in 3200 parts of water is effective in immunizing lumber to both the blue-staining fungi and the blue molds.

Another suitable composition is obtained by wetting 660 parts of mercuric oxide with 530 parts of lead tetraethyl, mixing with 2300 parts of talc and sufficient ethyl alcohol to form a paste, and adding 360 parts of 85% phosphoric acid. The reaction is vigorous and immediate. After drying, 33 parts of the reaction product is mixed with 20 parts of sodium pentachlorophenolate. This product mixed with 47 parts of borax gives a product which when dissolved in water in the proportions of two pounds per 100 gallons will give a treating solution having the necessary alkalinity to prevent corrosion of the equipment and iron tannate staining in oak and chestnut lumber and at the same time ample concentration of ethyl mercury pentachlorophenolate and sodium pentachlorophenolate to give complete and effective protection against the attack of the blue-staining fungi and the blue molds throughout any seasoning period.

In the above reaction if the sodium pentachlorophenolate is added prior to or simultaneously with the addition of the phosphoric acid or before the mixture has been dried an immediate reaction takes place giving the ethyl mercury pentachlorophenolate in form of a reaction mixture. These compositions are equally effective and in practical effect are indistinguishable from the simple mixtures.

Still another suitable composition is obtained by wetting 50 parts of mercuric oxide with 40 parts of lead tetra ethyl, mixing with 185 parts of talc and sufficient ethyl alcohol to form a paste, and adding 184 parts of pentachlorophenol. The reaction is immediate but not vigorous. After stirring for two hours all of the mercuric oxide is reacted and the reaction is complete. After drying, 468 parts of borax is added giving a product which when dissolved in water in the proportion of two pounds per 100 gallons will give a treating solution having the necessary alkalinity to prevent corrosion of the equipment and iron tannate staining in oak and chestnut lumber, and to carry the unreacted pentachlorophenol into solution. At the same time ample concentrations of ethyl mercury pentachlorophenolate and pentachlorophenol (combined and uncombined) are provided to give complete and effective protection against the attack of blue staining fungi and the blue molds throughout any seasoning period.

While we have described our invention with particular reference to a preservative treatment for freshly sawn lumber, it is to be understood that our invention is in no respect limited thereto but that it comprehends novel processes, novel compositions of matter, novel compounds as herein described and set forth in the appended claims.

We claim:

1. In the preservation of wood and cellulosic materials the method which comprises treating the material with the mercury-containing product of the reaction of an organic mercury compound of the type RHgX in which R is a nonionic organic radical and X is an anion with a compound selected from the class consisting of pentachlorophenol and its salts.

2. In the preservation of wood and cellulosic materials the method which comprises treating the material with the mercury-containing product of the reaction of an aliphatic mercury compound of the type $C_2H_5HgX$ in which X is an anion with a compound selected from the class consisting of pentachlorophenol and its salts.

3. In the preservation of wood and cellulosic materials the method which comprises treating the material with ethyl mercury pentachlorophenolate.

4. A fungicidal composition consisting in a dry free-flowing powder containing as an essential active ingredient an ethyl mercury pentachlorophenolate.

5. A fungicidal composition consisting in a dry free-flowing powder containing as an essential active ingredient alkyl mercury pentachlorophenolate.

6. As a new compound ethyl mercury pentachlorophenolate.

7. A composition of matter comprising in admixture a water-soluble salt of pentachlorophenol and an ethyl mercury salt, said salts being capable of interacting in the presence of water to form ethyl mercury pentachlorophenolate.

8. For the control of sap stain in green lumber, a composition of matter comprising an ethyl mercury salt in admixture with at least an equal quantity of sodium pentachlorophenolate and sufficient alkaline material to provide an alkaline solution when said composition is dissolved in water in the proportions of approximately two pounds per hundred gallons, the quantities of the ethyl mercury salt and the sodium pentachlorophenolate being sufficient to protect green lumber treated with such an aqueous solution against discoloration by blue staining fungi and blue mold during the normal seasoning period.

9. For the control of sap stain in green lumber, a composition of matter comprising ethyl mercury phosphate in admixture with at least an equal quantity of sodium pentachlorophenolate and sufficient sodium salt of a weak acid to provide an alkaline solution when said composition is dissolved in water in the proportions of approximately two pounds per hundred gallons, the quantities of ethyl mercury phosphate and sodium pentachlorophenolate being sufficient to protect green lumber treated with such an aqueous solution against discoloration by blue staining fungi and blue mold during the normal seasoning period.

10. In the seasoning of lumber the method of preventing discoloration by blue staining fungi and blue mold during the seasoning period which comprises treating the unseasoned lumber with an aqueous solution of an alkyl mercury salt and an alkali metal pentachlorophenolate in the proportions of at least one part by weight of the alkali metal salt of pentachlorophenol for each part of the alkyl mercury salt.

11. In the treatment of freshly-sawn lumber to prevent discoloration by micro-organisms causing stain and mold, the method which comprises treating the freshly-sawn lumber with an aqueous solution of the mercury-containing products of the reaction of a compound selected from the class consisting of organic mercury hydroxides of the type RHgOH and the salts thereof in which R is a non-ionic radical and a compound selected from the class consisting of pentachlorophenol and the salts thereof.

12. In the treatment of freshly-sawn lumber to prevent discoloration by micro-organisms causing stain and mold, the method which comprises treating the freshly-sawn lumber with an aqueous solution of the mercury-containing products of the reaction of a compound selected from the class consisting of alkyl mercury hydroxides and the salts thereof and a compound selected from the class consisting of pentachlorophenol and the metallic salts thereof.

ALBERT L. FLENNER.
FRANK H. KAUFERT.
PAUL L. SALZBERG.